Figure 1:
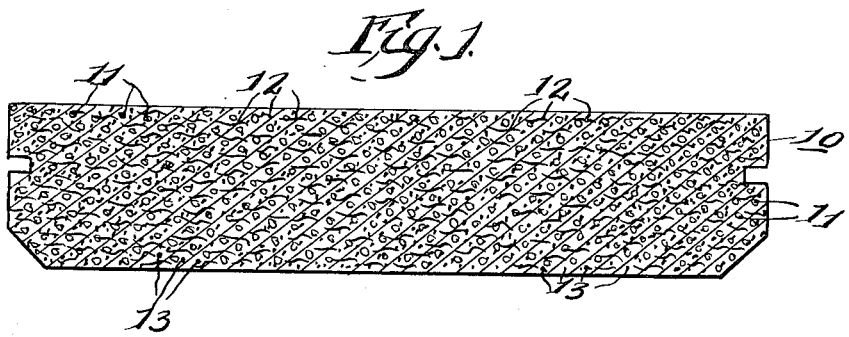

May 10, 1966  R. F. COTTS  3,250,633
MOLDED MINERAL FIBER ACOUSTICAL TILE
Filed Jan. 17, 1962  2 Sheets-Sheet 1

Inventor.
Ronald F. Cotts.
By James W. Grace
Attorney.

May 10, 1966 R. F. COTTS 3,250,633
MOLDED MINERAL FIBER ACOUSTICAL TILE
Filed Jan. 17, 1962 2 Sheets-Sheet 2

Inventor,
Ronald F. Cotts.
By James W. Grace
Attorney.

3,250,633
MOLDED MINERAL FIBER ACOUSTICAL TILE
Ronald F. Cotts, Evanston, Ill., assignor, by mesne assignments, to The Celotex Corporation, a corporation of Delaware
Filed Jan. 17, 1962, Ser. No. 166,875
7 Claims. (Cl. 106—214)

The present invention relates to an acoustical tile, and more particularly to a fire resistant acoustical tile in which there are mineral fibers of at least two different types.

In present building construction, the damage to life and property caused by fire has necessitated the installation of fire retardant material throughout buildings. Because of this, acoustical tile must be incombustible. Not only must the tile be incombustible, but since such tile is conventionally suspended in a mechanical suspension system, the tile must resist shrinkage laterally and in thickness. If the tile shrinks excessively laterally, it may fall out of the suspension system and permit penetration of flame and hot gases into the area above the ceiling. If the tile shrinks excessively in thickness, it may well collapse and fall out of the suspension system, again allowing penetration of flame and hot gases. Furthermore, the tile must have internal strength so that it does not sag or deform while it is held in the suspension system. Also, for reasonable handability, the tile must be strong to resist breakage.

The mineral fiber tile of the present invention is of the molded type, wherein a mixture of granulated mineral wool fibers and a binder, preferably of starch, is prepared. This mixture, being uniform in texture, is dispersed onto a paper covered moving conveyor belt, whereupon the mixture is screeded to form fissures and to bring the thickness of the mixture to approximately its desired thickness. In the laboratory, a molded acoustical tile may be made by dispersing the mixture into a series of molds.

The formed mixture is then air-dried for a short period, after which it is baked in an oven for a period sufficient to drive off the excess moisture. The dried product is then mechanically fabricated into its final form.

An acoustical tile of the molded type is conventionally made with granular mineral wool fibers and a starch binder. The granular wool fibers are in the form of small tufts or balls of mineral wool, in contrast to the long, relatively straight mineral wool fibers used in a felted mineral wool acoustical tile.

The present invention is an improvement over the conventional molded acoustical tile in that an amount of asbestos fibers are added to the mixture. Within certain limits an amount of mineral wool may be replaced by the asbestos fibers to form an acoustical tile which is stronger, and has less shrinkage and sag upon the application of heat to the tile than conventional molded acoustical tile.

It is an object of the present invention to provide a novel acoustical tile which incorporates asbestos fibers to increase the strength of the tile.

It is another object of the present invention to provide an acoustical tile which has less shrinkage in any dimension than conventional acoustical tile when subjected to heat.

It is yet another object of the present invention to provide an acoustical tile of the molded type incorporating asbestos fibers which is stronger and has less shrinkage than conventional acoustical tile.

Figure 3:
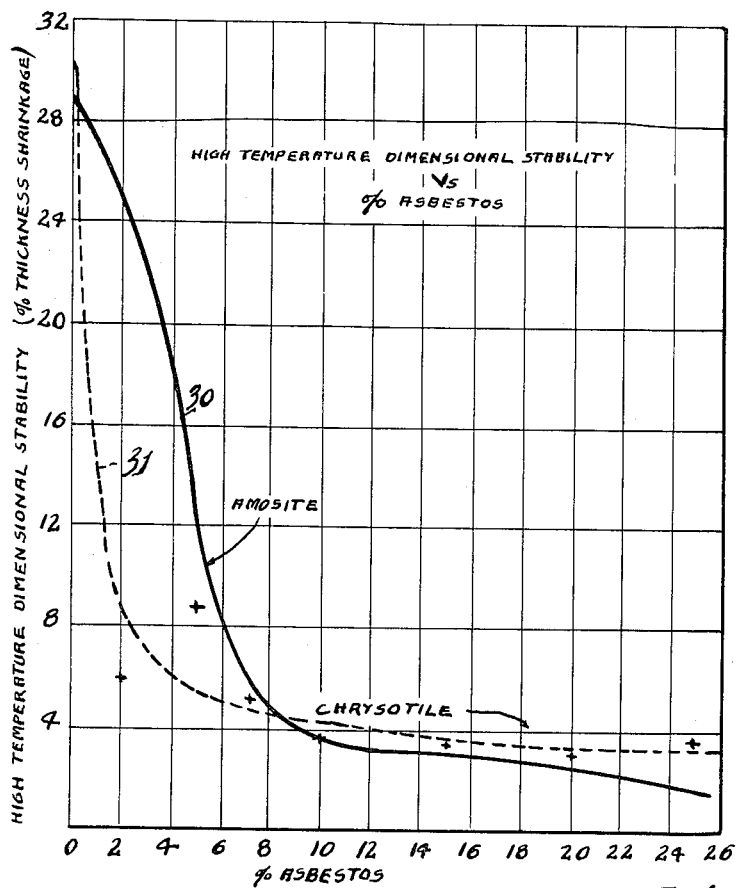
Figure 2:
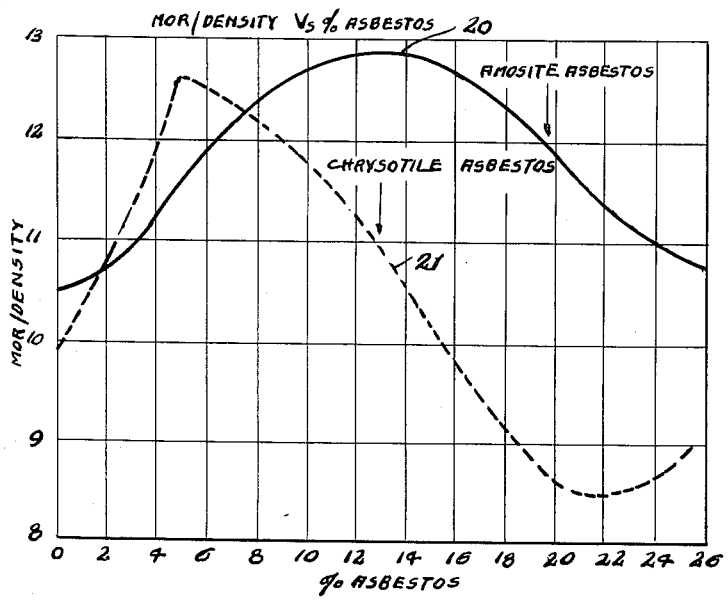
Figure 4:
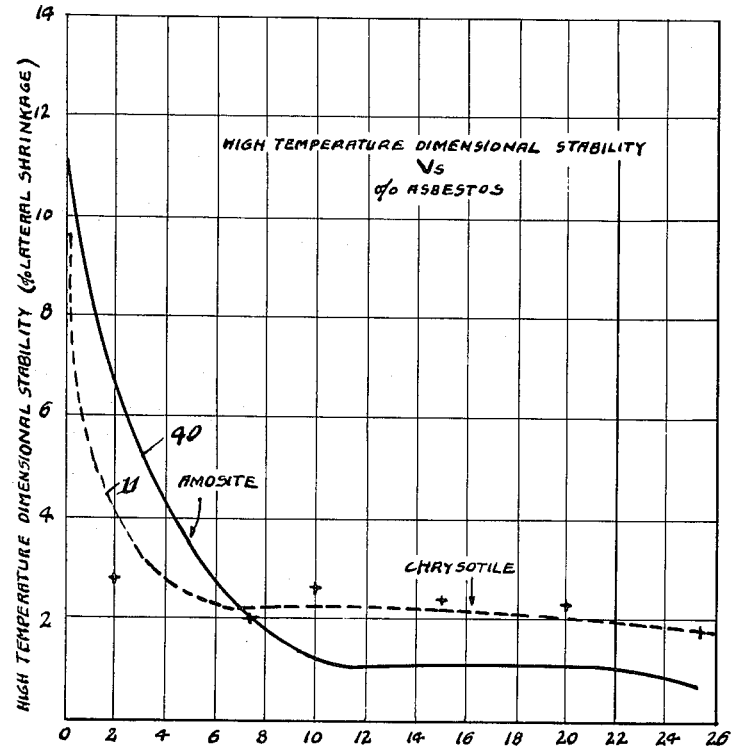

Other objects and advantages of the acoustical tile of the present invention will become apparent from a consideration of the following detailed description of the invention in conjunction with the accompanying drawings, in which:

FIGURE 1 is a cross-sectional view of an acoustical tile made in accordance with the invention; and FIGURES 2, 3 and 4 are graphical representations useful in explaining the invention.

Referring now to FIGURE 1, there is shown an acoustical tile 10 having incorporated therein mineral wool fibers 11, asbestos fibers 12, clay 13, and a starch binder throughout which the clay particles are suspended.

The mineral wool fibers are made by any conventional fiberizing process and then granulated or formed into nodules or tufts of mineral wool by conventional means. Thus, the mineral wool may be fiberized by applying a stream of molten slag on the surface of a horizontal rotor which divides the slag into a multiplicity of individual streams thrown off the rotor periphery by centrifugal force. A blast of steam or air is directed against the streams to attenuate the molten slag in stream form into relatively long, individual fibers. The fibers are then collected in a collection chamber to form a blanket of mineral wool fibers.

The method of forming tufts or granules of mineral wool from the blanket formed in the collection chamber is illustrated in Patent No. 2,375,284 issued to Coss. A stationary rack and a rotatable paddle rack operate in the manner of complementing combs to tear small granules or tufts of fibers from the blanket and deposit them on a conveyer.

The asbestos fibers actually tested in the acoustical tile of the invention were of two types of asbestos. One type was amosite asbestos, which is a true amphibole in which the molecules are arranged in the form of long narrow strips. The second type tested was chrysotile asbestos, whose molecular structure is believed to comprise a tubular structure. The amosite asbestos is available from deposits in South Africa. Another amphibole asbestos, crocidolite, is available not only from South Africa, but also from deposits in Australia and Bolivia. The chrysotile asbestos is available from deposits in Canada, Russia and Rhodesia.

The amosite asbestos found most suitable for use in the acoustical tile is grade A 10, supplied by the North American Asbestos Company of Chicago, Illinois. Grade A 10 is a grade of short fiber length and is processed from asbestos seams between one-half and three-quarter inch long.

The chrysotile asbestos is a short length fiber of grade 7 D, as described in the literature of Asbestos Corporation Limited of Quebec, Canada, which company is a supplier of chrysotile asbestos. The various grades of chrysotile are determined by a sieve process in which three screens are arranged in spaced relationship above a pan. The screens are arranged so that the screen of least mesh is on top and those of greater mesh are below in the order of their fineness. A one-pound sample of asbestos is placed on the top screen and the screens are agitated for a preset period of time. The amounts of asbestos left on each screen and in the plan is weighed to find the classification of the asbestos. For grade 7 D, five ounces of asbestos is left on the finest screen and eleven ounces passes through the finest screen to be deposited on the pan.

There is a preference for relatively short asbestos fibers from the standpoint of fissuring the acoustical tile with a movable screed bar. However, the length of the fibers may be much longer, if desired.

It has been found that the inclusion of a non-swelling clay in the starch binder has greatly enhanced the dimensional stability and the strength of the tile. Such non-swelling clay is of the kaolin type and includes such clays as kaolinite, ball clay, talc and chrysotile. These clays are introduced in pulverized form, in contrast to the filamentary fibers of chrysotile asbestos or amosite asbestos referred to above. The amount of clay added should be not less than 12% by weight of the fibers, and preferably between 20 and 25% by weight thereof.

PROCESS FOR MAKING THE MOLDED ACOUSTICAL TILE

The following ingredients are used to make a molded acoustical tile according to the invention:

Fibers—per tile 1" x 14" x 28": Grams
  (1) Granulated mineral wool _____ 1620.0
  (2) Asbestos (either amosite or chrysotile) _ 180.0
Binder—(starch milk) per four 1" x 14" x 28" boards:
  (3) Starch _____ 1716.0
  (4) Broke _____ 564.0
  (5) Calgon _____ 6.2
  (6) Water—5280.0 cc. @ 150° F. plus or minus 10°.
Clay—water mix—per four 1" x 14" x 28" boards:
  (7) Clay _____ 1593.0
  (8) Boric acid _____ 220.0
  (9) Paraffin _____ 185.0
  (10) Water—14,784.0 cc. (32.5#).
  (11) Quench water—13,376 cc. (29.4#). 80° F.
  (12) Binder per board—18.6#.

Procedure:
  (1) Add Calgon to water No. 6 and heat to 150° F. plus or minus 10°.
  (2) Add boric acid and paraffin to water No. 10. Heat to boiling. (Allow paraffin to melt before step No. 3.)
  (3) Add clay to water No. 10.
  (4) When water No. 10 is boiling, add starch and broke to water No. 6.
  (5) Add starch milk to clay-water mix.
  (6) Cook starch gel 15 minutes at 195° F. plus 5° F.
  (7) Add water No. 11 to starch gel. Mix 2 minutes.
  (8) Determine viscosity (800 cps. plus 400 cps. at 170° F.).
  (9) Mix wool-asbestos in Hobart Mixer—dry—2 minutes.
  (10) Add 18.6# starch gel to wool-asbestos mix. Mix 4 minutes.
  (11) Place in 1½" x 14" x 28" mold form. After screeding and removing form, punch holes in board approximately 1" apart to allow air to escape from center of board during drying.
  (12) Set board 1 hour before drying.
  (13) Dry at 250° F. 20–48 hours.

For a further description of the materials used in the manufacture of the acoustical tile, the following table of definitions is presented:

Calgon—Sodium hexametaphosphate, commercial grade
Boric acid—Granular, technical grade
Paraffin wax—Fully refined paraffin 133–135° F. M.P.
Starch—Commercial grade
Broke—Ground material from other acoustical tile of similar composition. Usually pulverized dust from reject tile made according to the method herein given.

RESULTS OF TESTS ON MOLDED ACOUSTICAL TILE

The following table is a summary of the results of tests performed on the molded acoustical tile made in accordance with the foregoing procedure. The major difference in the tiles was the substitution of different amounts of asbestos for mineral wool.

ASBESTOS-KAOLIN INTERACTIONS LABORATORY MOLDED PROTECTONE

| Percent Asbestos | Type of Asbestos | Density, #/Cu. Ft. | Break Strength, M.O.R. | High Temp. Stability, Lateral | Dimensional, Percent Thickness |
|---|---|---|---|---|---|
| 0 | Amosite | 22.5 | 236 | 11.3 | 28.9 |
| 2 | do | 22.8 | 245 | 6.8 | 25.5 |
| 5 | do | 22.9 | 265 | 3.4 | 13.6 |
| 7½ | do | 23.7 | 263 | 1.7 | 4.0 |
| 10 | do | 22.9 | 290 | 1.4 | 3.0 |
| 15 | do | 23.9 | 307 | 1.1 | 4.2 |
| 20 | do | 23.5 | 279 | 1.1 | 1.9 |
| 25 | do | 22.1 | 241 | 0.9 | 2.2 |
| 0 | Chrysotile | 22.9 | 227 | 9.5 | 30.7 |
| 2 | do | 22.7 | 246 | 2.7 | 5.8 |
| 5 | do | 23.1 | 292 | 2.7 | 6.5 |
| 7½ | do | 23.3 | 272 | 2.0 | 5.0 |
| 10 | do | 23.0 | 271 | 2.4 | 3.6 |
| 15 | do | 23.7 | 242 | 2.3 | 3.3 |
| 20 | do | 23.0 | 198 | 2.2 | 3.2 |
| 25 | do | 23.1 | 206 | 1.9 | 3.4 |

The results shown in the above table are shown graphically in FIGURES 2, 3 and 4.

FIGURE 2 is a graph showing the strength of the acoustical tile as a function of the percent of asbestos (amosite and chrysotile) and substituted for mineral wool fibers based on the total combined weight of the asbestos and the mineral wool. Since the modulus of rupture (M.O.R.) is a function of the density of the tile, the ratio of M.O.R. divided by density is believed to be a more meaningful indication of the strength of the tile. Consequently, the ratio of M.O.R. divided by density is plotted against the percent asbestos for both amosite asbestos and chrysotile asbestos.

FIGURES 3 and 4 are graphical representations of the results of shrinkage against percent asbestos. FIGURE 3 shows the effect of shrinkage in thickness, while FIGURE 4 shows the effect of lateral shrinkage.

To determine the percent shrinkage in thickness and in the lateral dimension caused by high temperature, the acoustical tiles were heated in an oven at a temperature of 1550° F. for thirty minutes. Following this, the tiles were allowed to cool to room temperature in a desiccator until they reached room temperature, about 70° F. The measured dimensions after the heating were compared to the measured dimensions before heating to determine the percent shrinkage.

FIGURE 2 shows along line 20, the effect of the substitution of amosite asbestos for various amounts of mineral wool fibers. Thus, a peak strength (M.O.R./density) appears at about 13% asbestos with a gradual decrease in strength on either side. Since the acoustical tile with no asbestos has an M.O.R./density ratio of about 10.5 and the peak ratio is about 12.9, there is an unexpected increase in strength of about 22.8% with the substitution of about 13% amosite fibers in the acoustical tile.

Reference to FIGURE 3 shows the remarkable effect of the addition of amosite asbestos with regard to the shrinkage in thickness of the tile, as shown by line 30. With no asbestos in the actoustical tile there is a shrinkage in thickness of 28.9%. With the substitution of 10% of amosite asbestos, there is a shrinkage of only about 3%. Additional amosite asbestos further reduces the shrinkage to less than 2% at about 24% amosite asbestos.

FIGURE 4 shows, at line 40, the effect of the substitution of amosite asbestos for mineral wool fibers with regard to lateral shrinkage. With no asbestos, the lateral shrinkage is 11.3%. For a substitution of about 10% amosite asbestos for mineral wool, the lateral shrinkage drops to about 1.4%. Further substitutions of amosite asbestos improves the lateral shrinkage to about 0.9% at 25% amosite.

It can thus be concluded that an amount of amosite asbestos in the amount of 10% gives the tile excellent strength and resistance to shrinkage. At a substitution of 13%, the optimum strength is achieved with again a slight improvement both in lateral shrinkage and shrinkage in thickness. From an economic standpoint, further increase in substitution of amosite asbestos beyond about 20% does not seem to be warranted.

With regard to the substitution of chrysotile asbestos, the characteristics of the improved product, as indicated by lines 21, 31 and 41 of FIGURES 2, 3 and 4, may be considered. From a strength standpoint, there is a definite peak in strength when about 5% chrysotile asbestos is substituted for mineral wool fibers. The strength drops off rather rapidly with either an increase or decrease in the amount of chrysotile asbestos substituted. Since the strength of the tile, expressed as M.O.R./density with no asbestos is about 9.9 and its peak strength is about 12.6, there is an increase in strength of about 27.2%.

The initial slope of line 31 indicates a remarkable improvement in shrinkage and thickness for amounts of chrysotile up to about 6%. Thereafter, there is some improvement but not as so rapid a rate. Further increase of the amount of chrysotile asbestos beyond 8% does not improve the shrinkage as much as the addition of amosite asbestos in the same range.

With regard to lateral shrinkage, there is a rapid improvement up to about 6% chrysotile asbestos, as shown by line 41 of FIGURE 4. Thereafter, further increase in the amount of chrysotile asbestos shows very little improvement, and beyond 7% the addition of amosite asbestos rather than chrysotile asbestos shows the greater improvement. Thus, for 12% substitution of asbestos for mineral wool fibers, the amosite asbestos product has a lateral shrinkage of about 1%, while the chrysotile asbestos product has a lateral shrinkage of slightly over 2%.

The conclusion to be drawn is that for an acoustical product incorporating chrysotile asbestos, the optimum amount of asbestos is about 5–6%, while for an acoustical product incorporating amosite asbestos, the optimum amount of asbestos is about 10–18%.

In summary, there has been set forth a new and novel acoustical tile made of granulated mineral wool fiber and asbestos fiber which has remarkable dimensional stability and strength. The tile is capable of maintaining its integrity under conditions of extreme heat so that it may be used in present construction requiring fire retardant material.

While there has been set forth and described embodiments of the novel fire retardant acoustical tile of the present invention, other modifications and changes may occur to those skilled in the art, and it is intended to include such modifications and changes in the scope of the appended claims.

I claim:

1. A rigid, self-supporting acoustical tile having high temperature dimensional stability consisting essentially of a mixture of about 80–95% by weight of the fiber portion of the tile of granulated mineral wool fibers and 20–5% by weight of the fiber portion of the tile of asbestos fibers and a starch binder, said starch binder being present in an amount sufficient to form said acoustical tile.

2. A rigid, self-supporting acoustical tile having high temperature dimensional stability consisting essentially of a mixture of about 80–95% by weight of the fiber portion of the tile of granulated mineral wool fibers and 20–5% by weight of the fiber portion of the tile of asbestos fibers from the group consisting of amphibole asbestos and chrysotile asbestos, and a starch binder, said starch binder being present in an amount sufficient to form said acoustical tile.

3. A rigid, self-supporting acoustical tile having high temperature dimensional stability consisting essentially of a mixture of about 80–95% by weight of the fiber portion of the tile of granulated mineral wool fibers and 20–5% by weight of the fiber portion of the tile of asbestos fibers from the group consisting of amosite asbestos and chrysotile asbestos, and a starch binder, said starch binder being present in an amount sufficient to form said acoustical tile.

4. A rigid, self-supporting acoustical tile having high temperature dimensional stability consisting essentially of a mixture of about 80%–95% by weight of the fiber portion of the tile of granulated mineral wool fibers and 20%–5% by weight of the fiber portion of the tile of asbestos fibers, and a starch binder, said mixture constituting between 62% and 86% by weight of said acoustical tile and said binder constituting between 14% and 38% by weight of said acoustical tile.

5. A rigid, self-supporting acoustical tile having high temperature dimensional stability consisting essentially of a mixture of about 80–95% by weight of the fiber portion of the tile of granulated mineral wool fibers and 20–5% by weight of the fiber portion of the tile of asbestos fibers from the group consisting of amphibole asbestos and chrysotile asbestos, and a starch binder, said mixture constituting between 62% and 86% by weight of said acoustical tile and said binder constituting between 14% and 38% by weight of said acoustical tile.

6. A rigid, self-supporting acoustical tile having high temperature dimensional stability consisting essentially of a mixture of about 80–95% by weight of the fiber portion of the tile of granulated mineral wool fibers and 20–5% by weight of the fiber portion of the tile of asbestos fibers from the group consisting of amosite asbestos and chrysotile asbestos, and a starch binder, said mixture constituting between 62% and 86% by weight of said acoustical tile and said binder constituting between 14% and 38% by weight of said acoustical tile.

7. A rigid, self-supporting acoustical tile having high temperature dimensional stability consisting essentially of a mixture of about 80%–95% by weight of the fiber portion of the tile of granulated mineral wool fibers and 20% to 5% by weight of the fiber portion of the tile of asbestos fibers, and a starch binder including non-swelling clay material in the amount of not less than 12% based on the combined weight of the mineral wool fibers and the asbestos fibers, said mixture constituting between 62% and 86% by weight of said acoustical tile and said binder constituting between 14% and 38% by weight of said acoustical tile.

References Cited by the Examiner

UNITED STATES PATENTS

| | | | |
|---|---|---|---|
| 1,996,032 | 3/1935 | Roos | 106—214 |
| 2,509,599 | 5/1950 | Hollenberg | 106—99 |
| 2,884,380 | 4/1959 | Cook | 106—282 |
| 3,114,671 | 12/1963 | Eberle | 106—210 |

ALEXANDER H. BRODMERKEL, *Primary Examiner.*

JOSEPH REBOLD, MORRIS LIBERMAN, *Examiners.*

J. CARSON, L. B. HAYES, *Assistant Examiners.*